United States Patent
Ashizawa et al.

[11] Patent Number: 6,052,639
[45] Date of Patent: Apr. 18, 2000

[54] SHIFT CONTROL APPARATUS OF CONTINUOUSLY VARIABLE TRANSMISSION

[75] Inventors: Hiroyuki Ashizawa, Kanagawa; Kazutaka Adachi, Yokohama; Tatsuo Ochiai, Kanagawa, all of Japan

[73] Assignee: Nissan Motor Co., Ltd., Yokohama, Japan

[21] Appl. No.: 09/102,361

[22] Filed: Jun. 23, 1998

[30] Foreign Application Priority Data

Jun. 23, 1997 [JP] Japan .................................. 9-166129

[51] Int. Cl.$^7$ ...................................................... G06F 17/00
[52] U.S. Cl. ................ 701/55; 701/51; 701/56; 701/61; 477/43; 477/46; 477/49
[58] Field of Search .................................. 701/51, 55, 56, 701/61; 477/2, 43, 46, 48, 49, 68, 109, 115, 117

[56] References Cited

U.S. PATENT DOCUMENTS

| | | |
|---|---|---|
| 4,916,982 | 4/1990 | Suzuki . |
| 5,099,710 | 3/1992 | Nakano . |
| 5,586,953 | 12/1996 | Abo ............................................ 477/47 |
| 5,695,428 | 12/1997 | Yuasa et al. ................................ 477/48 |
| 5,790,968 | 8/1998 | Kashiwabara et al. .................... 701/51 |
| 5,976,054 | 11/1999 | Yasuoka ..................................... 477/48 |

FOREIGN PATENT DOCUMENTS

8-74958  3/1996  Japan .

Primary Examiner—William A. Cuchlinski, Jr.
Assistant Examiner—Gertrude Arthur
Attorney, Agent, or Firm—Foley & Lardner

[57] ABSTRACT

A shift control apparatus outputs a command transmission ratio to a continuously variable transmission (CVT) to control a real transmission ratio of the CVT. The shift control apparatus comprises a shift mode determining section determines whether an actually selected shift mode is an automatic upshift or a power-down upshift (foot-release upshift), on the basis of the result of a previously selected shift mode, a difference between a final objective transmission ratio and a transient objective transmission ratio and a rate of change in the transmission ratio per time. The dynamic characteristic selecting section determines the dynamic characteristic according to the determined shift mode.

10 Claims, 8 Drawing Sheets

SHIFT CONTROL APPARATUS OF CONTINUOUSLY VARIABLE TRANSMISSION

The contents of application No. P9-166129, with a filing date Jun. 23, 1997 in Japan, are hereby incorporated by reference.

BACKGROUND OF THE INVENTION

The present invention relates to improvements in a shift control apparatus of a continuously variable transmission (CVT), and more particularly to a shift control apparatus arranged to accurately decide a shift mode for determining a shift control dynamic characteristic which is employed to realize a final objective transmission ratio according to a running condition of a vehicle.

A Japanese Patent Provisional Publication No. 8-74958 discloses a typical shift control apparatus of a continuously variable transmission (CVT) which apparatus is arranged to compare a basic transmission ratio determined according to an operating condition of a CVT equipped vehicle with a transient controlled objective transmission ratio, in order to determine whether the selected shift is an upshift or an downshift. Further, the conventional shift control apparatus is arranged to determine whether the executed upshift is an automatic upshift or a power-down upshift, by checking a rate of change in a throttle opening TVO of an engine of a vehicle. Herein, the automatic upshift means an upshift executed automatically according to the increase of the vehicle speed, and the power-down upshift means an upshift executed at a time when a foot of a driver is released from an accelerator pedal of the engine. On the basis of the determined shift mode, the conventional shift control apparatus determines a suitable shift speed (a rate of change in the transmission ratio) of the CVT by each of the downshift, the power-down upshift and the automatic upshift, and calculates a transient controlled objective transmission ratio for changing the real transmission ratio to the basic transmission ratio by the determined shift speed.

Figure 8A:
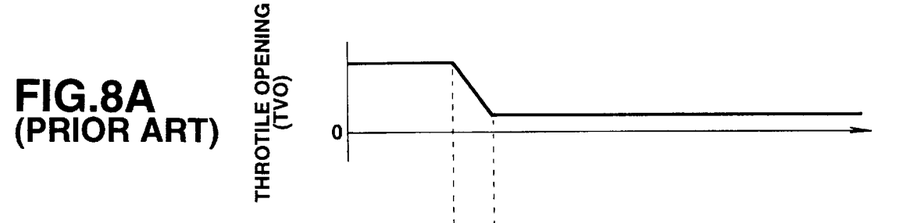
FIGS. 8A to 8E are time charts which show a shift mode determining process of a conventional shift control apparatus.
Figure 8B:
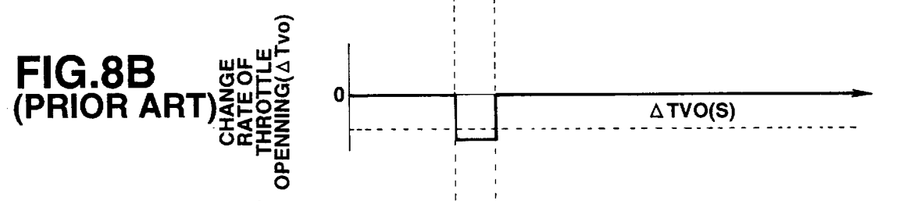
Figure 8C:
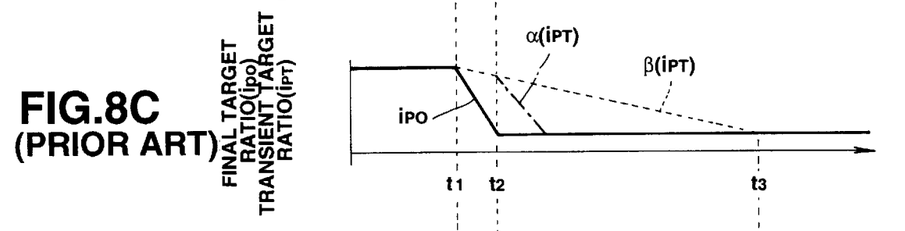
Figure 8D:
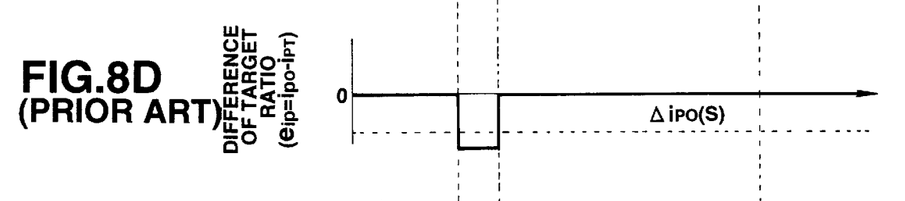
Figure 8E:
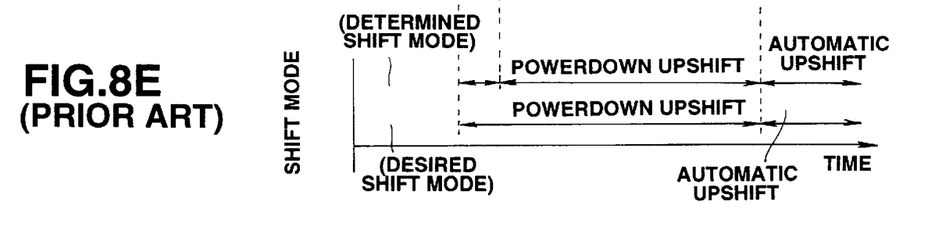

However, the conventional shift control apparatus has a possibility of incorrectly determining an automatic upshift as the power-down upshift since arranged to determine that the power-down upshift is executed when the rate of change in the throttle opening TVO is greater than a predetermined value or when an absolute value of the rate of change in the basic transmission ratio is greater than a predetermined value. The operation of the conventional shift control apparatus will be mentioned as to a case that an accelerator pedal is depressed so as to generate a time series change of the throttle opening with reference to time charts of FIGS. 8A to 8E. During a period between moments $t_1$ and $t_2$ in FIGS. 8A to 8E, a rate $|\Delta ATVO|$ of change in the throttle opening TVO per time is greater than a predetermined value $\Delta TVO(S)$, or a rate $|\Delta i_{PO}|$ of change in the basic transmission ratio $i_{PO}$ per time is greater than a predetermined value $\Delta i_{PO}(S)$. Therefore, the conventional shift control apparatus correctly determines the shift mode as the power-down upshift. However, during a period between moments $t_2$ and $t_3$, the rate $|\Delta TVO|$ of change in the throttle opening TVO is smaller than a predetermined value $\Delta TVO(S)$, and the rate $|\Delta i_{PO}|$ of change in the basic transmission ratio $i_{PO}$ is smaller than a predetermined value $\Delta i_{PO}(S)$. Therefore, the conventional shift control apparatus makes an incorrect decision that the shift mode during the period between the moments $t_2$ and $t_3$ is an automatic upshift although the power-down upshift should be still maintained. In such a case, the transient controlled objective transmission ratio $i_{PT}$ is determined so as to select a shift speed for the automatic upshift on the basis of the incorrect decision as shown by an alternate long and short dash line $\alpha(i_{PT})$ of FIG. 8C. That is, although a driver is requiring a slow shift speed corresponding to that of the power-down upshift such that the transient controlled objective transmission ratio $i_{PT}$ changes on a dotted line $\beta(i_{PT})$ of FIG. 8C, the conventional shift control apparatus selects a quick shift speed which provides a strange feeling to the driver.

SUMMARY OF THE INVENTION

It is an object of the present invention to provide an improved shift control apparatus of a continuously variable transmission which apparatus is arranged to accurately execute a shfit mode determination between an automatic upshift and a power-down upshift (foot release upshift).

According to the present invention, a shift control apparatus of a continuously variable transmission outputs a command transmission ratio to the continuously variable transmission to control a real transmission ratio of the continuously variable transmission. The shift control apparatus comprises an objective transmission ratio difference calculating section, a rate calculating section, a shift mode determining section and a dynamic characteristic selecting section. The objective transmission ratio difference calculating section calculates an objective transmission ratio difference between the final objective transmission ratio and a transient objective transmission ratio and the final objective transmission ratio. The rate calculating section calculates a rate of change in the final objective ratio per time. The shift mode determining section determines whether an actually selected shift mode is an automatic upshift or a power-down upshift, on the basis of the result of a previously selected shift mode, the objective transmission ratio difference and the rate of change in the transmission ratio. The dynamic characteristic selecting section determines the dynamic characteristic according to the determined shift mode.

DETAILED DESCRIPTION OF THE INVENTION

Referring to FIGS. 1 to 7, there is shown an embodiment of a shift control apparatus 100 of a continuously variable transmission (CVT) 50 according to the present invention.

Figure 1:
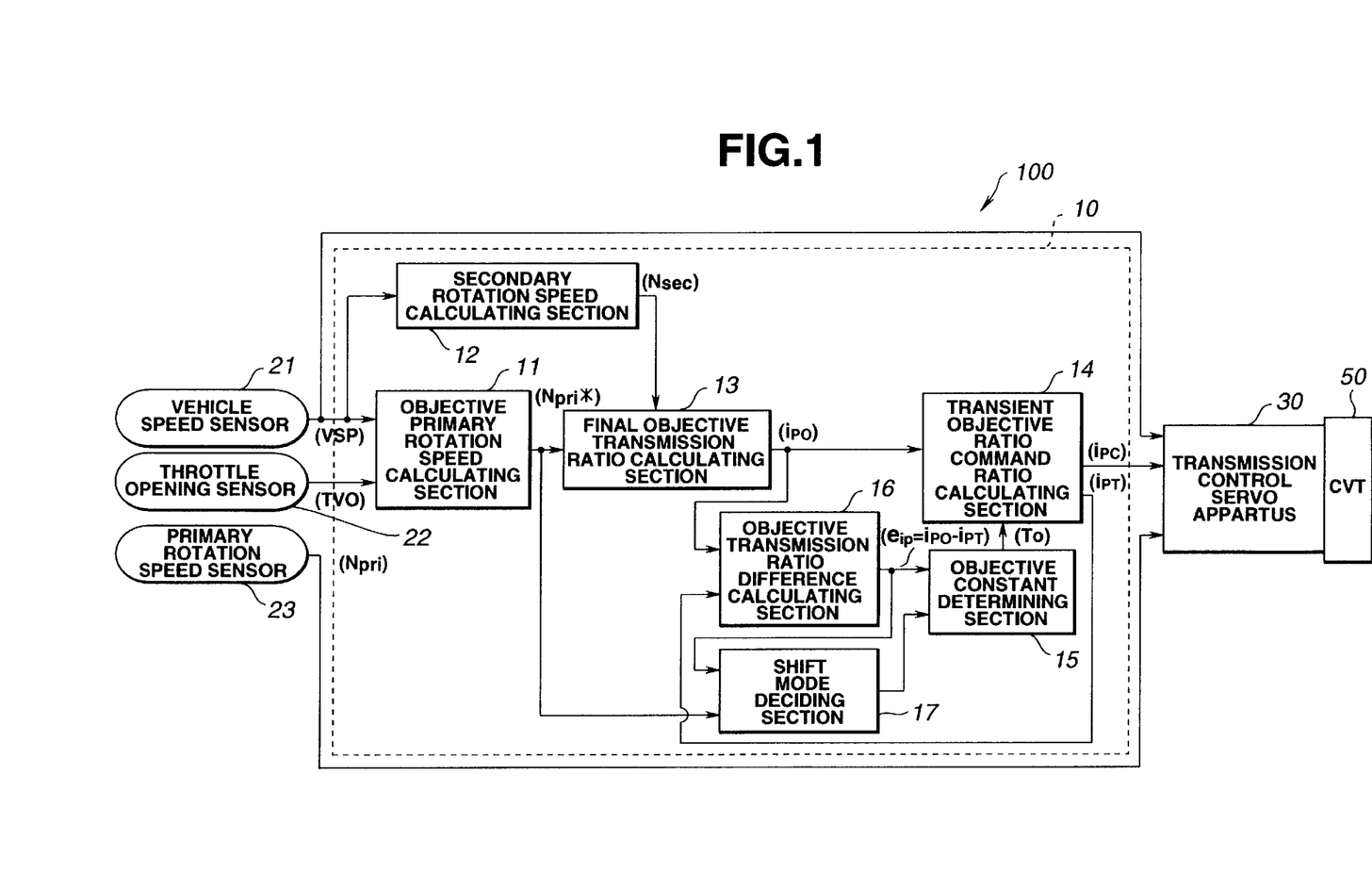
FIG. 1 is a block diagram which shows a first embodiment of a shift control apparatus of a continuously variable transmission (CVT) in accordance with the present invention.

As shown in FIG. 1, the shift control apparatus 100 according to the present invention is connected to the CVT 50 which produces an infinite number of gear ratios. the CVT 50 of a V belt type comprises, as is commonly known, a primary pulley (input pulley) and a secondary pulley (output pulley) which are arranged to change diameters of their V-shaped grooves. A V-belt is set to the V-shaped grooves of the primary and secondary pulleys to steplessly change a transmission ratio (CVT ratio) corresponding to a gear ratio of a common transmission for a vehicle.

The shift control apparatus 100 comprises a command transmission ratio determining apparatus 10 and a transmission control servo apparatus 30. The command transmission ratio determining apparatus 10 receives a signal indicative of a vehicle speed VSP detected by a vehicle speed sensor 21, a signal indicative of a throttle opening TVO detected by a throttle opening sensor 22, and a signal indicative of a rotation speed $N_{pri}$ of the primary pulley detected by a primary rotation speed sensor 23. The command transmission ratio determining apparatus 10 determines a command transmission ratio $i_{PC}$ on the basis of the received signal information.

The transmission control servo apparatus 30 executes a feedback control such that a real transmission ratio $i_{PR}$, which is calculated as a ratio between the primary-pulley rotation speed $N_{pri}$ and a secondary-pulley rotation speed derived from the vehicle speed VSP, is controlled at a command transmission ratio $i_{PC}$. This feedback control corresponds to a part B in a block diagram of FIG. 2.

The command transmission ratio determining apparatus 10 is constituted by an objective primary rotation speed calculating section 11, a secondary rotation speed calculating section 12, a final objective transmission ratio calculating section 13, a transient objective transmission ratio calculating section 14, an objective transmission control constant determining section 15, an objective transmission ratio difference calculating section 16 and the shift mode deciding section 17.

Figure 3:
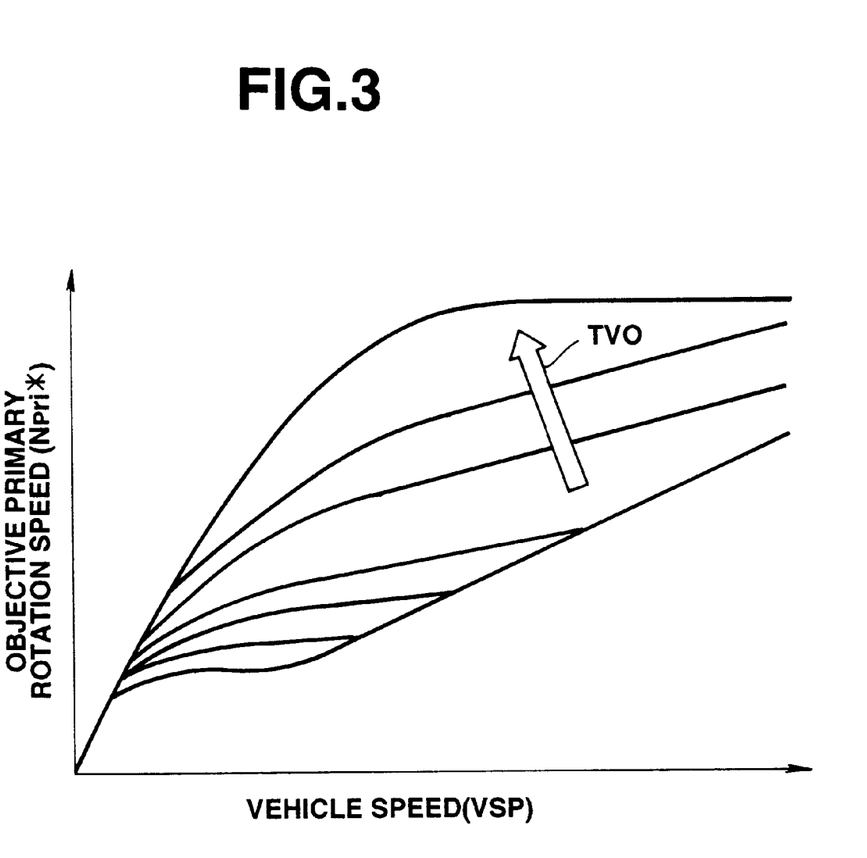
FIG. 3 is a graph which shows a control characteristic relating to the objective primary pulley rotation speed of the CVT.

The objective primary rotation speed calculating section 11 retrieves an objective primary rotation speed $N_{pri}*$ adapted to a present operating condition by using a preset objective primary rotation speed map such as a map shown in FIG. 3 from the combination of the vehicle speed VSP and the throttle opening TVO.

The secondary rotation speed calculating section 12 calculates a secondary rotation speed $N_{sec}$ of the secondary pulley by multiplying a constant to the vehicle speed VSP.

The final objective transmission ratio calculating section 13 calculates a final objective transmission ratio $i_{PO}$ by dividing the retrieved objective primary rotation speed $N_{pri}*$ by the secondary rotation speed $N_{sec}$.

Figure 2:
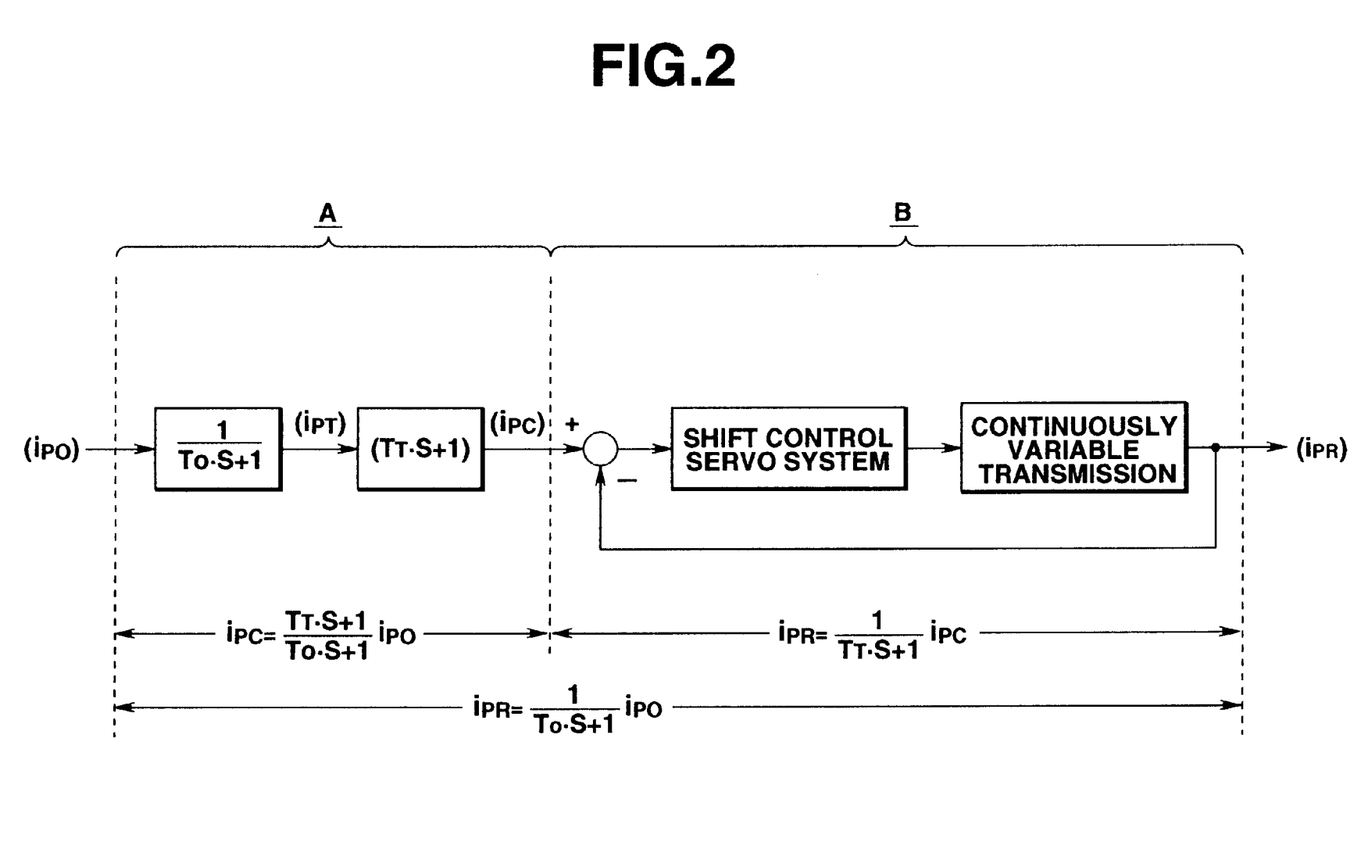
FIG. 2 is a view for explaining the relationship among a final objective transmission ratio, a transient objective transmission ratio, a command transmission ratio, and a real transmission ratio.

The transient objective transmission ratio and command transmission ratio calculating section 14 first calculates a transient objective transmission ratio $i_{PT}$ for realizing the final objective transmission ratio $i_{PO}$ from the equation $i_{PT}=[1/(T_0 \cdot S+1)]i_{PO}$ where $T_0$ is a time constant, S is a Laplace operator, and $[1/(T_O \cdot S+1)]$ is a dynamic characteristic corresponding to a part A of FIG. 2. Next, the transient objective transmission ratio and command transmission ratio calculating section 14 calculates a command transmission ratio $i_{PC}$ by multiplying the transient objective transmission ratio $i_{PT}$ to an inverse system $(T_T \cdot S+1)$ which is an inverse system of the dynamic characteristic $(T_T \cdot S+1)$ of the transmission control servo apparatus 30 corresponding to the part B of FIG. 2. That is, the transient objective transmission ratio and command transmission ratio calculating section 14 calculates the command transmission ratio $i_{PC}$ from the equation $i_{PC}=[(T_T \cdot S+1)]i_{PT}$.

Since the command transmission ratio $i_{PC}$ is obtained from the equation $i_{PC}=[(T_T \cdot S+1)/(T_0 \cdot S+1)]i_{PO}$ and the final objective transmission ratio $i_{PO}$, the real transmission ratio $i_{PR}$ is consequently controlled by the dynamic characteristic $i_{PR}=[1/(T_0 \cdot S+1)]i_{PO}$ with respect to the final objective transmission ratio $i_{PO}$.

Therefore, the real transmission ratio $i_{PR}$ is not affected by the dynamic characteristic $[1/(T_T \cdot S+1)]$ and is controlled by the dynamic characteristic affected only by the time constant $T_0$. Therefore, the dynamic characteristic of the real transmission ratio $i_{PR}$ can be set freely by the time constant $T_0$.

Hereinafter, the method for determining the time constant $T_0$ of the objective transmission control constant will be discussed.

The objective transmission ratio difference calculating section 16 calculates an objective transmission ratio difference $e_{iP}$ which is a difference between the final objective transmission ratio $i_{PO}$ and the transient objective transmission ratio $i_{PT}$ ($e_{ip}=i_{PO}-i_{PT}$).

Figure 4:
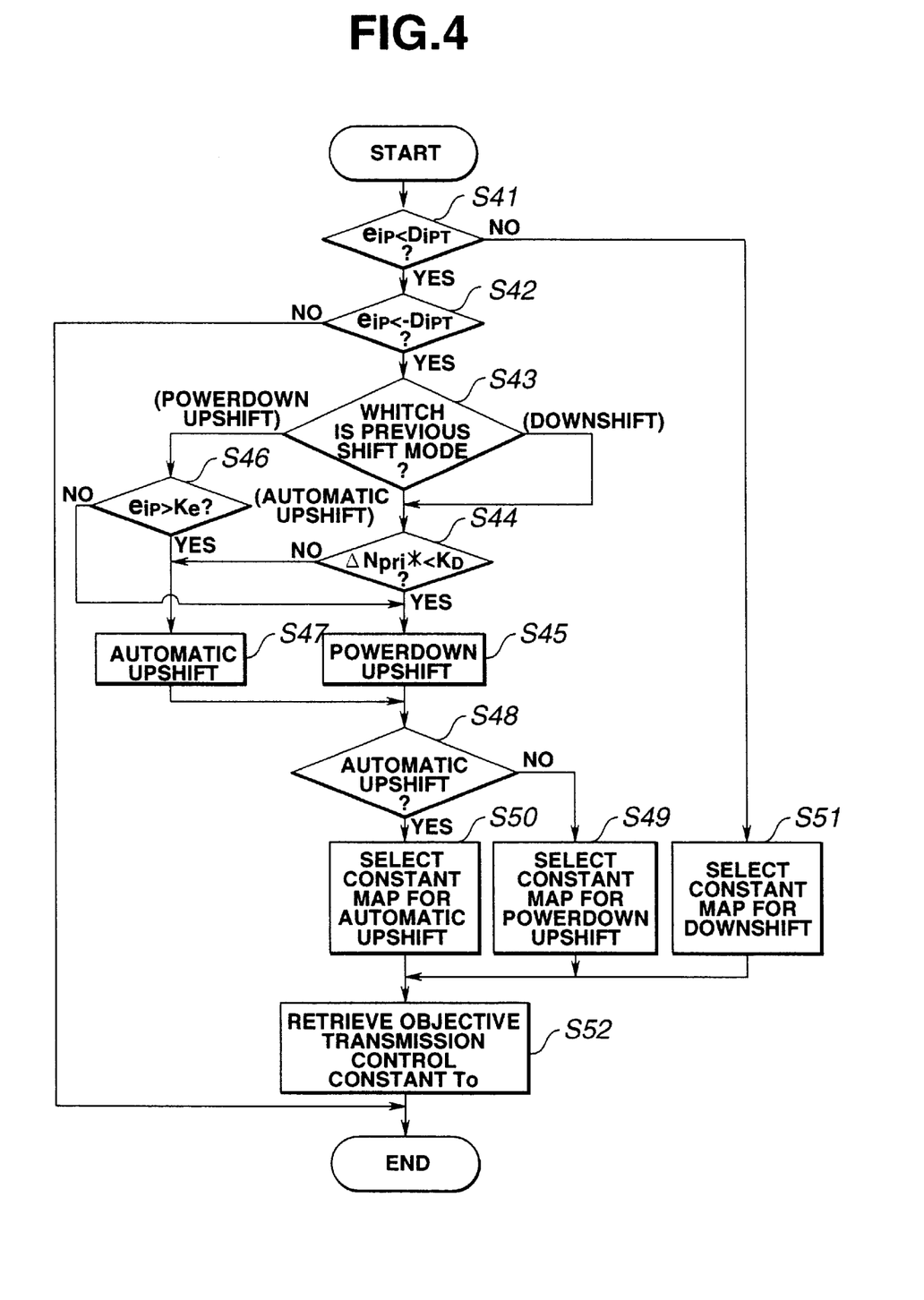
FIG. 4 is a flowchart which shows a process executed at a shift mode determining section and a shift control constant determining section of the shift control apparatus.

The shift mode deciding section 17 executes a transmission mode deciding process corresponding to steps S41 to S47 shown in a flowchart of FIG. 4, where it is determined which shift (a downshift or an upshift) is selected, and it is determined which upshift (automatic upshift or power-down upshift) is selected if the upshift is selected.

More particularly, at the step S41, it is determined whether or not the objective transmission ratio difference $e_{ip}$ is smaller than a positive shift decision value $+D_{iP}$. At the step S42, it is determined whether or not the objective transmission ratio difference $e_{ip}$ is smaller than a negative shift decision value $-D_{iP}$. That is, by the implement of the steps S41 and S42, it is decided as to whether or not the objective transmission ratio difference $e_{iP}$ is out of a range from the negative shift decision value $-D_{ipT}$, to the positive shift decision value $+D_{ipT}$.

When the determination at the step S41 is affirmative and when the determination at the step S42 is negative, that is, when the objective transmission ratio difference $e_{iP}$ is within a range from the negative shift decision value $-D_{ipT}$ to the positive shift decision value $+D_{ipT}$, it is determined that no shift is executed and therefore the routine proceeds to an end so as to maintain the present objective control constant $T_0$.

When the determination at the step S41 is negative, that is, when it is determined that the downshift is executed, the routine proceeds to a step S51.

When the determination at the step S42 is affirmative, that is, when it is determined that the upshift is executed, the routine proceeds to a step S43.

In the process of the steps S43 to S47, it is determined as to whether the executed upshift is a power-down upshift or an automatic upshift.

More particularly, at the step S43, it is checked whether the shift mode decision result in the previous routine is a downshift, the automatic upshift automatically executed according to the increase of the vehicle speed or the power-down upshift executed when a foot of a driver is released from an accelerator pedal of the engine. When it is determined at the step S43 that the previous decision result of the shift mode is the downshift or the automatic upshift, the routine proceeds to a step S44 wherein it is determined whether a rate $\Delta N_{pri}*$ of change in the objective primary rotation speed $N_{pri}*$ is smaller than a power-down upshift decision value $K_D$ or not. When the determination at the step S44 is negative, the routine proceeds to a step S47 wherein it is decided that the automatic upshift is executed. When the decision at the step S44 is affirmative, the routine proceeds to a step S45 wherein it is decided that the power-down upshift is executed. When it is determined at the step S43 that the previous decision result as to the selected shift mode is the power-down upshift, the routine proceeds to a step S46 wherein it is determined whether or not the objective transmission ratio difference $e_{ip}$ is greater than an automatic upshift decision value $K_e$. When the determination at the step S46 is affirmative, the routine proceeds to the step S47. When the determination at the step S46 is negative, the routine proceeds to the step S45.

The objective transmission control constant determining section 15 is arranged to determine the time constant $T_0$ of the objective transmission control constant by executing steps S48 to S52 of FIG. 4.

Figure 6:
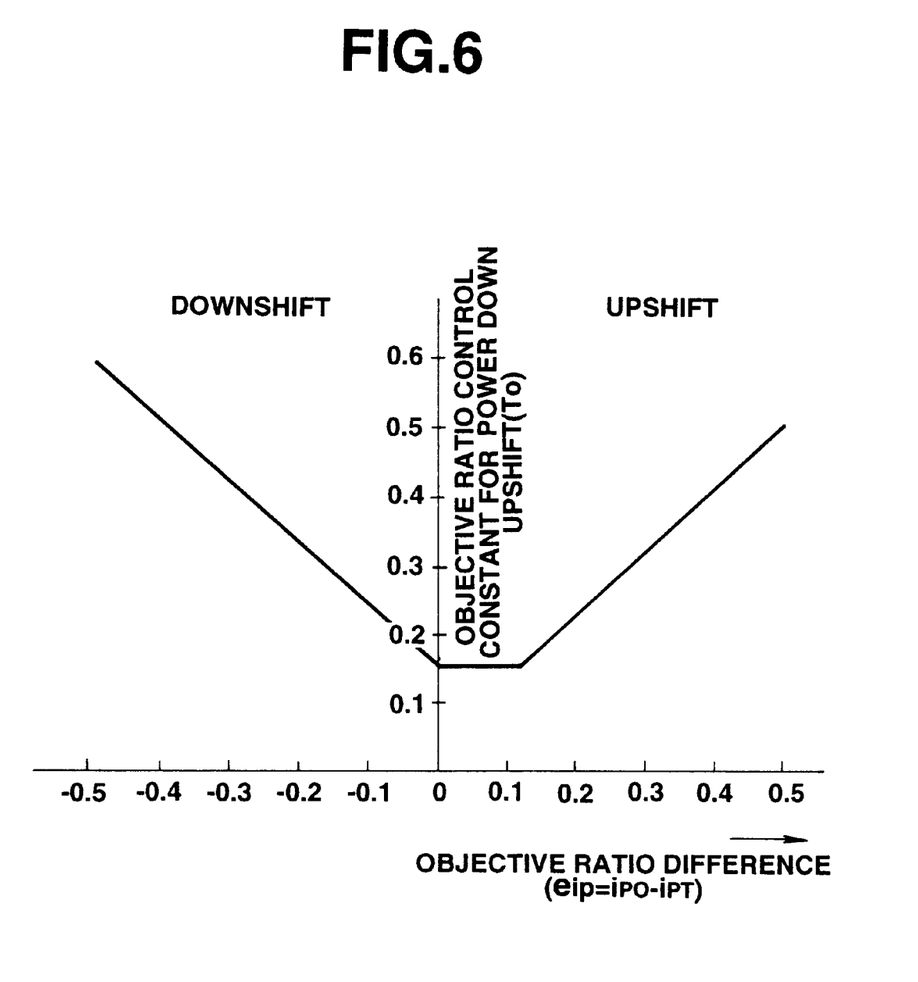
FIG. 6 is a graph showing a relationship between the shift control constant and the objective ratio deviation for determining a dynamic characteristic of the shift control of the CVT.

That is, at the step S48, it is checked whether or not the automatic upshift is selected in the present execution or not, that is, which the step S45 or S47 is executed. When it is determined at the step S48 that the power-down upshift is executed, the routine proceeds to a step S49 wherein a transmission control constant map for the power-down upshift embodied in FIG. 6 is selected. Then, the routine proceeds to a step S52 wherein the time constant $T_0$ is retrieved from the objective transmission ratio difference $e_{ip}$ and the transmission control constant map for the power-down upshift.

When it is determined at the step S46 that automatic upshift is executed, the routine proceeds to a step S50 wherein a transmission control constant map for the automatic upshift is selected. Following to the execution at the step S50, the routine proceeds to the step S52 wherein the time constant $T_0$ is retrieved from the objective transmission ratio difference $e_{ip}$ and the transmission control constant map for the automatic upshift.

When it is determined at the step S41 that downshift is executed, the routine proceeds to the step S51 wherein a transmission control constant map for the downshift is selected. Following to the execution at the step S51, the routine proceeds to the step S52 wherein the time constant $T_0$ is retrieved from the objective transmission ratio difference $e_{ip}$ and the transmission control constant map for the automatic upshift.

The time constant $T_0$ of the shift control determined according to the shift mode is supplied from the objective constant determining section 15 to the transient objective transmission ratio and command transmission ratio calculating section 14. The transient objective transmission ratio and command transmission ratio calculating section 14 obtains the command transmission ratio $i_{PC}$ which is not affected by the dynamic characteristic $[1/(T_T \cdot S+1)]$ of the transmission control servo apparatus 30 and is affected by the dynamic characteristic $[1/(T_0 \cdot S+1)]$ determined only by the time constant $T_0$, in order to finally obtain the final objective transmission ratio $i_{PO}$. The obtained command transmission ratio $i_{pc}$ is inputted to the shift control servo apparatus 30.

Figure 5:
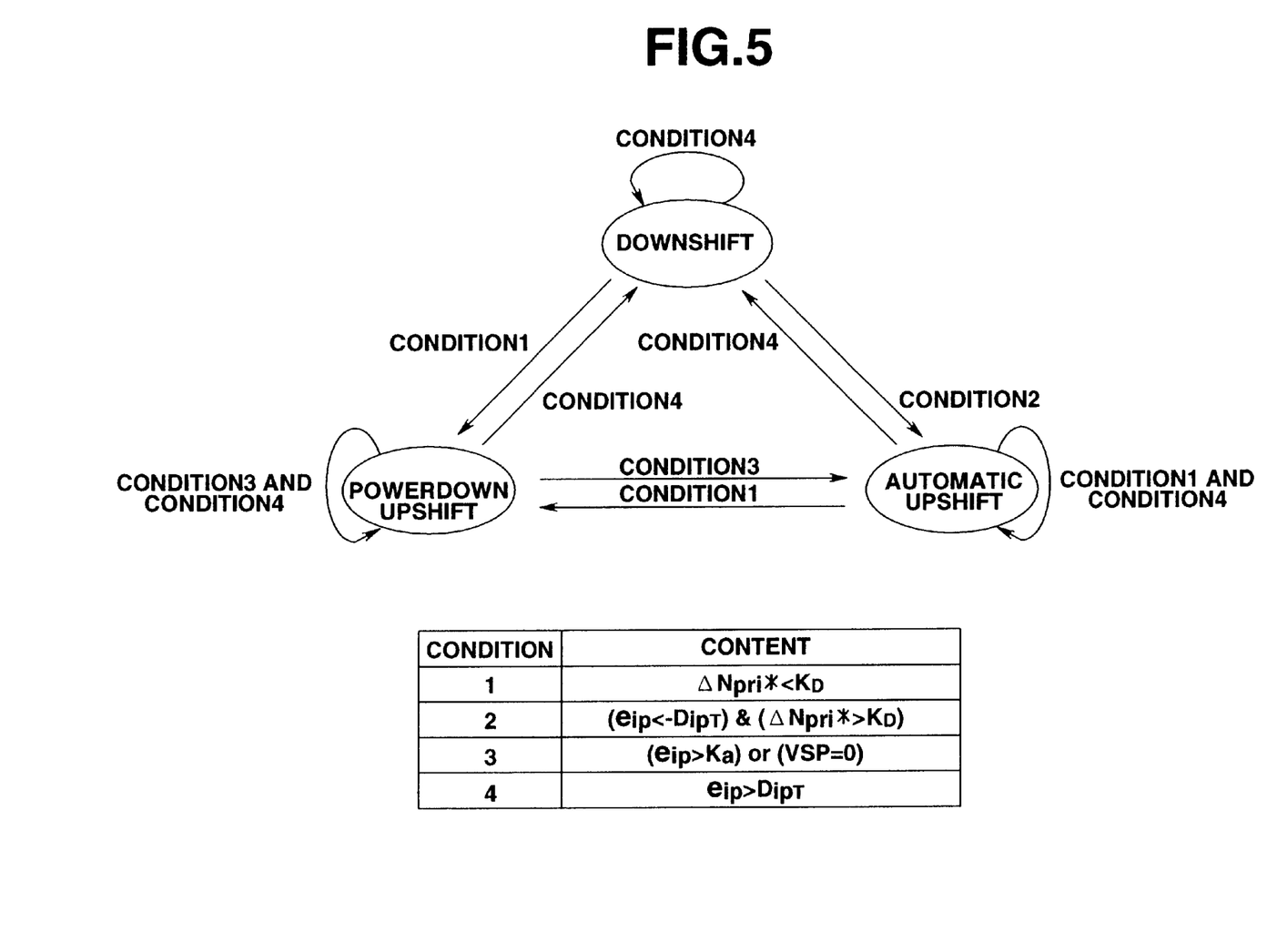
FIG. 5 is a view showing a condition transition view of the shift mode determining section.

The conditional transition of the shift mode deciding process by the shift mode deciding section 17 is schematically shown by FIG. 5. Herein, a condition VSP=0 in the condition 3 represents that a vehicle starts to move. Since only the automatic upshift is executed during this starting period, it is included in the condition 3 of the automatic upshift.

Figure 7A:
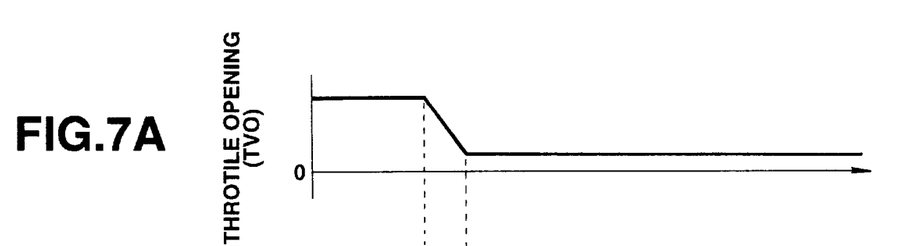
FIGS. 7A to 7E are time charts which show a shift mode determining process of the shift control apparatus according to the present invention.
Figure 7B:
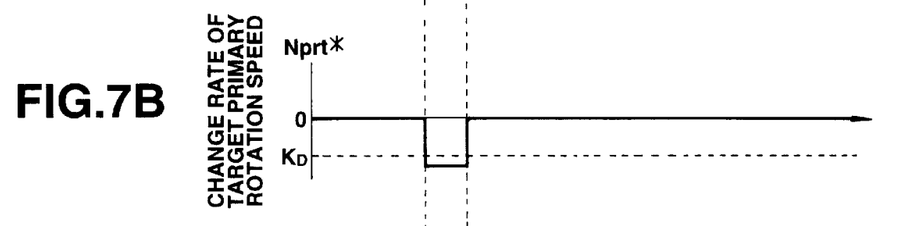
Figure 7C:
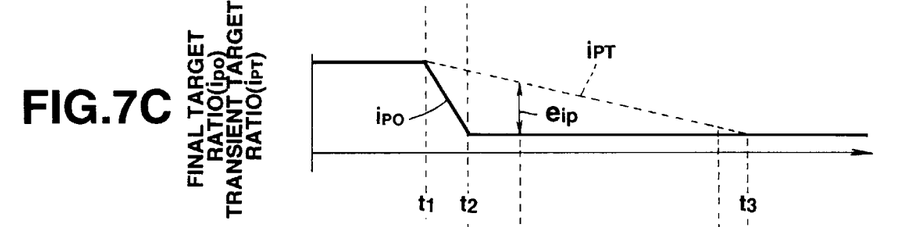
Figure 7D:
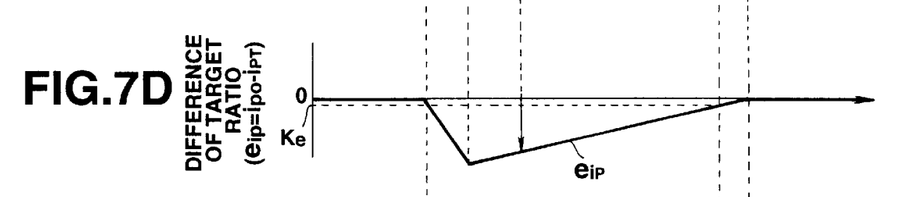
Figure 7E:
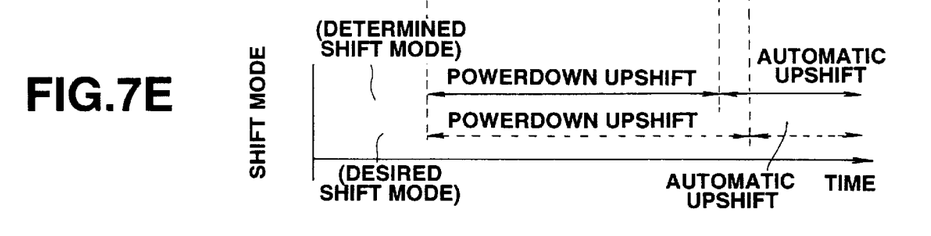

With the thus arranged shift mode decision technique according to the present invention, when the throttle opening TVO is quickly closed by releasing a foot of a driver from the acceleration pedal as shown in FIG. 7A, the shift control apparatus 100 according to the present invention determines that the power-down upshift is executed without determining that the automatic upshift is executed. Although the conventional shift control apparatus has incorrectly determined such a power-down shift as the automatic upshift, the sift control apparatus 100 according to the present invention correctly determines the upshift shown in FIG. 7A as the power-down upshift as shown in FIG. 7E.

When it is determined at the step S44 that the rate $\Delta N_{pri}*$ is smaller than the power-down upshift decision value $K_D$ or it is determined at the step S46 that the objective transmission ratio difference $e_{iP}$ is smaller than the automatic upshift decision value $K_e$, it is determined at the step S46 that the power-down upshift is executed. Therefore, in case of FIG. 7A, it is determined that the power-down upshift is executed even at a moment $t_2$ when a foot of the driver operating the engine equipped with the CVT 50 is just released from the acceleration pedal of the engine. Further, the correction determination is held until the moment $t_3$ when the shift is completed while avoiding the incorrect determination. Accordingly, as is clear from the rate shown by a dotted line of the transient objective transmission ratio $i_{PT}$ in FIG. 7C, the dynamic characteristics of the shift control is adapted to the power-down upshift such that the transmission ratio is slowly changed according to the power-down upshift. This solves the conventional problem that the large acceleration and deceleration are generated during such an upshift.

What is claimed is:

1. A shift control apparatus of a continuously variable transmission, the shift control apparatus outputting a command transmission ratio to the continuously variable transmission to control a real transmission ratio to a final objective transmission ratio by means of a selected dynamic characteristic, the shift control apparatus comprising:

an objective transmission ratio difference calculating section for calculating an objective transmission ratio difference between the final objective transmission ratio and a transient objective transmission ratio and the final objective transmission ratio;

a rate calculating section for calculating a rate of change in the final objective ratio per time;

a shift mode determining section for determining whether an actually selected shift mode is an automatic upshift executed according to the increase of a vehicle speed or a power-down upshift executed according to a foot release operation of a driver from an accelerator pedal, on the basis of the result of a previously selected shift mode, the objective transmission ratio difference and the rate of change in the transmission ratio; and a dynamic characteristic selecting section for determining the dynamic characteristic according to the determined shift mode.

2. A shift control apparatus as claimed in claim 1, wherein said rate calculating section outputs a rate of change in an objective transmission input rotation speed corresponding to the final objective ratio.

3. A shift control apparatus as claimed in claim 1, further comprising a shift determining section for determining whether an executed shift is an upshift or a downshift by comparing the objective transmission ratio difference with upper and lower shift decision values.

4. A shift control apparatus as claimed in claim 1, wherein said shift mode determining section determines that the power-down upshift is executed when said shift mode determining section determines that the previously selected shift is the automatic upshift and when the rate of change in the final objective transmission ratio is smaller than a power-down upshift decision value, and determines that the automatic upshift is executed when said shift mode determining section determines that the previously selected shift is the automatic upshift and when the rate of change in the final objective transmission ratio is not smaller than the power-down upshift decision value.

5. A shift control apparatus as claimed in claim 1, wherein said shift mode determining section determines that the automatic upshift is executed when said shift mode determining section determines that the previously selected shift is the power-down upshift and when the rate of change in the final objective transmission ratio is smaller than an automatic upshift decision value and determines that the power-down upshift is executed when said shift mode determining section determines that the previously executed shift is the power-down upshift and when the rate of change in the final objective transmission ratio is not smaller than the automatic upshift decision value.

6. A shift control apparatus as claimed in claim 1, wherein said shift mode determining section determines that the power-down upshift is executed when said shift mode determining section determines that the previously selected shift is the downshift and when the rate of change in the final objective transmission ratio is smaller than a power-down upshift decision value, and determines that the automatic upshift is executed when said shift mode determining section determines that the previously selected shift is the downshift and when the rate of change in the final objective transmission ratio is not smaller than the power-down upshift decision value.

7. A shift control apparatus as claimed in claim 1, wherein the dynamic characteristic for achieving the final objective transmission ratio is selected by selecting a time constant which affects the dynamic characteristic.

8. A shift control apparatus as claimed in claim 7, wherein the time constant is selected from a map selected according to the selected shift mode according the objective transmission ratio difference.

9. A shift control apparatus of a V belt type continuously variable transmission (CVT) connected to an internal combustion engine installed in an automotive vehicle, the shift control apparatus comprising:

a vehicle speed sensor detecting a vehicle speed and outputting a vehicle speed indicative signal;

a throttle opening sensor detecting a throttle opening of a throttle valve of the engine and outputting a throttle opening indicative signal;

a primary rotation speed sensor detecting a rotation speed of a primary pulley of the CVT and outputting a primary pulley rotation speed indicative signal;

a command transmission ratio determining apparatus; and a transmission control servo apparatus controlling a real transmission ratio calculated from the primary pulley rotation speed indicative signal and the vehicle speed indicative signal by means of a feedback control employing the command transmission ratio as an input and the real transmission ratio as a retransmitted input.

10. A shift control apparatus of a continuously variable transmission (CVT), comprising:

a sensor unit including a vehicle speed sensor a throttle opening sensor and a transmission input rotation speed sensor; and a controller determining a final objective transmission ratio of the CVT and feedback controlling a real transmission ratio by employing the following equation:

$$i_{PR} = [1/(T_0 \cdot S + 1)] i_{PO}$$

where $i_{PR}$ is the real transmission ratio, $i_{PO}$ is the final objective transmission ration, $T_0$ is a time constant determined according to a selected shift mode of the CVT and the signals from said sensor unit, and S is a Laplace operator.

* * * * *